United States Patent Office 3,138,558
Patented June 23, 1964

3,138,558
WATER DISPLACING RUST PREVENTIVE
COMPOSITION
Hayward R. Baker, Silver Spring, Md., and Curtis R. Singleterry, Potomac Valley, Va., assignors to the United States of America as represented by the Secretary of the Navy
No Drawing. Filed June 26, 1962, Ser. No. 205,468
4 Claims. (Cl. 252—395)
(Granted under Title 35, U.S. Code (1952), sec. 266)

The invention described herein may be manufactured and used by or for the Government of the United States of America for governmental purposes without the payment of any royalties thereon or therefor.

This invention relates to the preparation of new water-displacing, rust-preventive compositions.

It is known that removal of water from apparatus which has been flooded or otherwise wet with water can be facilitated and reconditioning of the apparatus expedited by the applications of water-displacing, rust-preventive compositions. Desirably such compositions should be nonflammable and also without disagreeable odor.

It is an object of the present invention to provide new water-displacing and rust-preventive compositions. It is also an object to provide compositions of this kind which are nonflammable, free from disagreeable odor and of lower cost.

The above and other objects are accomplished following our invention by the combined use of one or more aliphatic ketones of from 5 to 9 carbon atoms and isopropyl alcohol to solubilize a small amount of the polar rust inhibitor, basic barium dinonyl naphthalene sulfonate, and form aqueous solutions of these components in proportions hereinafter more fully described.

The new compositions of our invention are solutions of the aforesaid non-aqueous components in an amount of water which may range from about 40 to 60% by weight of the compositions. The content of the one or more aliphatic ketones in the compositions may range from about 5 to 25% by weight, of the isopropyl alcohol from about 25 to 50% by weight and of the polar rust inhibitor from about 0.5 to 5.0% by weight. In preferred compositions, the content of the one or more aliphatic ketones may range from about 10 to 15% by weight, of the isopropyl alcohol from 30 to 45% by weight and the polar rust inhibitor from about 2 to 3% by weight. A preferred concentration of water in the compositions is about 50% by weight thereof.

In addition to the role of solvent for initiating the solubilizing of the polar rust inhibitor in water, the aliphatic ketones of 5 to 9 carbon atoms are surface tension-depressants of low solubility in water and serve as such in the functioning of the new aqueous compositions as water-displacing agents. Ketones of the group are, for example, diethyl ketone, acetylacetone, methyl isobutyl ketone, methyl n-amyl ketone, ethyl butyl ketone, and diisobutyl ketone, etc. A preferred ketone for the preparation of the new aqueous compositions is methyl n-amyl ketone or ethyl butyl ketone, more especially, methyl n-amyl ketone.

Preparation of the new compositions may be accomplished by dissolving the polar rust inhibitor, basic barium dinonylnaphthalene sulfonate, in the aliphatic ketone or ketones, adding the isopropyl alcohol to the resulting ketone solution and then the water to the isopropyl alcohol solution of the ketone and polar rust inhibitor. If desired, the new compositions may be prepared by combining the isopropyl alcohol with the aliphatic ketone or ketones and dissolving the polar rust inhibitor in the combined solvents, followed by addition of the water thereto.

The presence of the relatively large proportion of water in the new compositions renders them nonflammable and makes possible the use of isopropyl alcohol which in undiluted form is too volatile and flammable to be acceptable as a component of water-displacing compositions. Isopropyl alcohol is less expensive and without the disagreeable odor of the aliphatic monohydric alcohols of 4 to 8 carbon atoms which have been hitherto proposed for use in the formulation of water-displacing compositions.

The new aqueous compositions are effective for displacement of water from surfaces in the reconditioning of water-wet apparatus, such as the salvaging of flooded electrical equipment.

Sprayed to a film of water on a metal surface, the new compositions quickly displace the water from the metal surface and cover its entire area with an adsorbed film of the polar rust inhibitor which is at least one molecule in thickness. This film being hydrophobic seals the metal surface against return of the displaced water thereto. Removal of the displaced water from the surface covered with the hydrophobic film is effected in part by being swept over the sides of the metal surface by the action of the compositions and in part by being swept away by the force of the applied spray. That which is not so removed stands as beads on the hydrophobic film and may be removed by rolling-off or sweeping away with an air stream. The water from the applied composition together with much of the isopropyl alcohol and the aliphatic ketone or ketones are merged with the displaced water and removed along with it. The rest of the isopropyl alcohol and the aliphatic ketone or ketones are rather quickly evaporated from the surface, the isopropyl alcohol almost immediately, to leave the metal surface in a dry condition and protected by the hydrophobic film.

In effecting displacement of the water of the film from the metal surface, for example, a steel surface, the sprayed composition spreads continuously from the point of application over the water surface, entraining water as it spreads until the metal substrate is exposed. Continuous spreading occurs because the spreading film is somewhat soluble in water, and dissolves in the water at the perimeter of the active area, so that a gradient of surface tension is maintained. Concomitantly, the polar rust inhibitor leaves the composition by reason of the dilution of the composition with water from the film and is adsorbed to the metal surface to form the hydrophobic film thereon. The hydrophobic film, intervening between the water of the film which has been swept away by the action of the composition and the metal surface, effects a permanent displacement of the water and that of the composition with which it is merged. By virtue of the high contact angle which the water makes with the hydrophobic film, the water is easily removable therefrom. The aliphatic ketones lower the surface tension of the compositions and increase the solubility of the polar rust inhibitor therein.

The invention is further illustrated by the following specific examples of the new compositions, the preparation of which is described above, wherein the polar rust inhibitor is added to the ketone or ketones, the isopropyl alcohol to the ketone solution, and the water to the isopropyl alcohol solution, in each instance with stirring to promote formation of the solutions. The polar rust inhibitor in each instance is basic barium dinonyl naphthalene sulfonate. Parts are by weight.

Example 1

| | Parts |
|---|---|
| Isopropyl alcohol | 28.0 |
| Methyl isobutyl ketone | 11.0 |
| Polar rust inhibitor | 1.0 |
| Water | 60.0 |
| | 100.0 |

Example 2

| | |
|---|---|
| Isopropyl alcohol | 37.0 |
| Methyl n-amyl ketone | 10.0 |
| Polar rust inhibitor | 3.0 |
| Water | 50.0 |
| | 100.0 |

Example 3

| | |
|---|---|
| Isopropyl alcohol | 37.0 |
| Ethyl butyl ketone | 10.0 |
| Polar rust inhibitor | 3.0 |
| Water | 50.0 |
| | 100.0 |

Example 4

| | |
|---|---|
| Isopropyl alcohol | 47.0 |
| Diisobutyl ketone | 10.0 |
| Polar rust inhibitor | 3.0 |
| Water | 40.0 |
| | 100.0 |

Example 5

| | Parts |
|---|---|
| Isopropyl alcohol | 40.0 |
| Acetyl acetone | 15.0 |
| Polar rust inhibitor | 1.0 |
| Water | 44.0 |
| | 100.0 |

Example 6

| | |
|---|---|
| Isopropyl alcohol | 37.0 |
| Methyl n-amyl ketone | 5.0 |
| Ethyl butyl ketone | 5.0 |
| Polar rust inhibitor | 3.0 |
| Water | 50.0 |
| | 100.0 |

In addition to functioning to displace water from wet equipment, the new compositions are useful for applying excellent protection against rusting to mechanical equipment in daily use in machine shops and factories. They may be used on wet or dry equipment to deposit a long lasting rust-protective film onto the metal surface treated.

While in the above description the invention has been described by reference to certain specific embodiments thereof, it is to be understood that such are to be taken by way of illustration and not in limitation except as may be defined in the appended claims.

What is claimed is:

1. An aqueous solution of from about 5 to 25% by weight of at least one aliphatic ketone having from 5 to 9 carbon atoms, from about 25 to 50% by weight of isopropyl alcohol and from about 0.5 to 5% by weight of basic barium dinonylnaphthalene sulfonate in an amount of water which is from about 40 to 60% by weight of the composition.

2. An aqueous solution of from about 10 to 15% by weight of at least one aliphatic ketone having from 5 to 9 carbon atoms, from about 30 to 45% by weight of isopropyl alcohol and from about 2 to 3% by weight of basic barium dinonylnaphthalene sulfonate in an amount of water which is from about 40 to 60% by weight of the composition.

3. An aqueous solution of from about 10 to 15% by weight of at least one aliphatic ketone having from 5 to 9 carbon atoms, from about 30 to 45% by weight of isopropyl alcohol and from about 2 to 3% by weight of basic barium dinonylnaphthalene sulfonate in an amount of water which is about 50% by weight of the composition.

4. A method of displacing water from and inhibiting rusting of a water-wet metal surface which comprises applying to said wet surface an aqueous solution of from about 5 to 25% by weight of at least one aliphatic ketone having from 5 to 9 carbon atoms, from about 25 to 50% by weight of isopropyl alcohol and from about 0.5 to 5% by weight of basic barium dinonylnaphthalene sulfonate in an amount of water which is from about 40 to 60% by weight of the composition.

References Cited in the file of this patent

UNITED STATES PATENTS 2,796,353     Dieman et al.     June 18, 1958

OTHER REFERENCES

Baker et al., Neutral and Basic Sulfonates, Ind. & Eng. Chem., volume 46 (1954), pages 1035–1042.